United States Patent
Tellan et al.

(10) Patent No.: US 11,747,961 B2
(45) Date of Patent: Sep. 5, 2023

(54) METHOD FOR COMPARING THROUGH A GRAPHICAL INTERFACE DATA FROM A DATABASE

(71) Applicant: INGLASS S.P.A.—CON SOCIO UNICO, San Polo di Piave (IT)

(72) Inventors: Andrea Tellan, San Polo di Piave (IT); Riccardo Villa, San Polo di Piave (IT)

(73) Assignee: INGLASS S.P.A., San Polo di Piave (IT)

(*) Notice: Subject to any disclaimer, the term of this patent is extended or adjusted under 35 U.S.C. 154(b) by 4 days.

(21) Appl. No.: 17/609,845

(22) PCT Filed: May 1, 2020

(86) PCT No.: PCT/IB2020/054139
§ 371 (c)(1),
(2) Date: Nov. 9, 2021

(87) PCT Pub. No.: WO2020/225683
PCT Pub. Date: Nov. 12, 2020

(65) Prior Publication Data
US 2022/0221962 A1    Jul. 14, 2022

(30) Foreign Application Priority Data
May 9, 2019  (IT) .................. 102019000006697

(51) Int. Cl.
*G06F 16/22*  (2019.01)
*G06F 3/0482*  (2013.01)

(52) U.S. Cl.
CPC ............ *G06F 3/0482* (2013.01); *G06F 16/22* (2019.01)

(58) Field of Classification Search
CPC ........ G06F 3/0482; G06F 16/22; G06F 3/048; Y02P 90/30; G06Q 50/04
See application file for complete search history.

(56) References Cited

U.S. PATENT DOCUMENTS 5,701,453 A * 12/1997 Maloney ............... G06F 16/217
                                                                707/999.102
7,603,394 B2 * 10/2009 Steinmaier .......... G06F 16/2428
(Continued)

FOREIGN PATENT DOCUMENTS

EP    1 544 750 A1    6/2005

OTHER PUBLICATIONS

International Search Report of PCT/IB2020/054139 dated Jan. 7, 2020.

*Primary Examiner* — Hien L Duong
(74) *Attorney, Agent, or Firm* — Mark M. Friedman

(57) ABSTRACT

A software-implemented method is described to compare via a graphical interface, freely crossing data relating to simulation results with finite-element analysis software and/or data concerning injection molding machine parameters obtained following molding tests or performed jobs, wherein the data are contained in an electronic database logically structured in one or more sets, and each set is divided into at least two logical portions (82, 84), one relating to the data relating to the simulation results and one relating to the press parameters (molding tests or works carried out), and each portion comprises a plurality of data collections organized internally in a plurality of fields.
Homologous fields of a first and second collection are displayed orderly through a graphical interface by finding the fields in the database through indices generated by the selections.

14 Claims, 1 Drawing Sheet

(56) References Cited

U.S. PATENT DOCUMENTS

Figure 1:
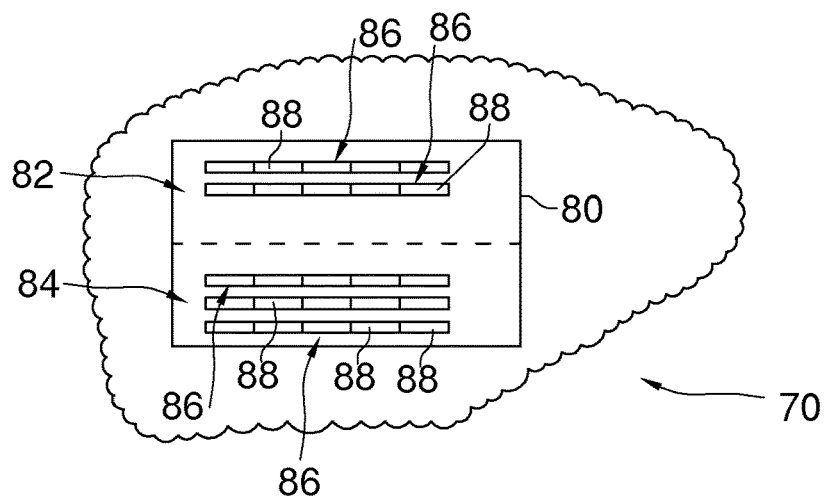

| | | | |
|---|---|---|---|
| 11,216,450 B1* | 1/2022 | Nhan | G06F 16/26 |
| 11,386,264 B2* | 7/2022 | Hofer | G06Q 10/10 |
| 2005/0198052 A1* | 9/2005 | Steinmaier | G06F 16/2428 |
| 2019/0113905 A1* | 4/2019 | Corr | G05B 19/408 |

* cited by examiner

METHOD FOR COMPARING THROUGH A GRAPHICAL INTERFACE DATA FROM A DATABASE

The invention refers to a software-implemented method and to a hardware system for comparing data from a database through a graphical interface. The method is described with particular reference to injection molding but can be used in any field of molding metal and plastic materials or other.

In general, for a specific piece to be molded the definition of the final molding parameters in an injection molding press starts from simulation results of the injection process or from tests or from previous works. A widely used simulation software is e.g. Autodesk Moldflow.

The simulation is however incomplete and approximate as it is not possible to simulate directly or indirectly the behavior, action and influence of the press in the molding process. Because of this deficiency, it is only the experience of the operator and the number of molding attempts (try-outs) that allow integrating the simulation output and correct it to reach the final set-up parameters for the press. The simulation results, although theoretically exact, are completely independent from the press, and do not involve all the parameters and real situations; that's why they must necessarily be corrected.

The results of the attempts and/or the simulation results are designed to converge as fast as possible towards optimized press set-up parameters. This allows to significantly decrease the number of attempts (try-outs to be performed on site by specialized personnel) with a consequent considerable decrease in terms of set-up costs.

Thus there is the problem of simplifying and assisting the analysis and/or processing operations of the results of the attempts and/or of the simulation results.

The main object of the invention is to solve or mitigate the aforementioned problem.

An aspect of the invention relates to a software-implemented method for comparing via a graphical interface data relating to an injection process (e.g. of fluid and/or molten material) carried out by an injection press, wherein the data are contained in an electronic database logically structured in one or more sets, each set being divided into at least two logical portions, e.g. one relating to data relating to simulation results and one relating to the press parameters (current and/or historical data and/or works and/or try-outs), each portion comprising a plurality of data collections internally organized in a plurality of fields, with the steps of (i) acquiring in real time through the graphic interface a first selection by a user aimed to select a data collections, (ii) acquiring in real time through the graphic interface a second selection by a user aimed to select a data collection different from the previous one (in particular a data collection belonging to a different portion), (iii) generating from the first selection of step (i) and from a second selection of step (ii) two respective indices to point to a first and second collection in the database, (iv) displaying orderly, through the graphical interface, homologous fields of the first and second collection by finding the fields in the database through the generated indices.

For example, the abovementioned data are data relating to the results of a simulation made with a finite-element analysis software and data concerning injection-press parameters obtained following a molding test and/or from previous works.

With the method there are various advantages, among which:

improving the interaction and/or consultation of a user with a database such as the abovementioned one, because long or repeated searches are avoided, and/or improving the display and/or fruition of different memory portions belonging to the aforementioned database; and/or improving the consultation of said database, because the close presentation of homologous data of different collections is intuitive to understand and facilitates understanding of the data distributions in the database, and/or improving the display of the internal state of the database, especially when the second group of homologous fields satisfies a logical condition or is the result of a processing, e.g. the maximum or minimum value in the database, or the closest value to data of the first group.

According to a preferred variant, the selection acquired in step (i) and the selection acquired in step (ii) refer to collections belonging to different portions or to the same.

According to a preferred variant, a or each user selection is acquired through drop-down or pop-up or scrolling menus generated by and/or on the graphical interface.

According to a preferred variant, the selection acquired in step (i) and/or in step (ii) are acquired directly or indirectly from an external source through a communication means (e.g. a QR code reader, radio transmission, OCR scanner, RFID transmission).

According to a preferred variant, step (iv) is activated, e.g. only, by a command or gesture of the user entered by means of a command input interface generated or present on said graphic interface, e.g. an icon or button.

According to a preferred variant, in step (iv) the fields are displayed alternating the displaying of the fields of one collection to those of the other collection. In particular, the alternation is controlled, e.g. only, by a command or gesture of the user entered or acquired through a command input interface generated or present on said graphic interface, e.g. an icon or button or sensor. Thus, there is the advantage e.g. to optimize the graphical interface's area, thanks to the alternation of data. The graphical interface is not crowded and specific areas thereof are activated for the second group of fields in response to user action.

According to a preferred variant, in step (iv) the fields are displayed by generating a new page on the graphical interface, on the page displaying together the fields of the two selected collections.

According to a preferred variant, the selection acquired in step (i) is modifiable after the execution of step (iii) and step (iv) while the second selection of the step (ii) remains stored as an active (or pre-set or reference) selection or is storable as active (or pre-set or reference) selection, so that subsequent executions of the—or of a—step (i) and/or (iii) and/or (iv) are based on an acquired selection and on the stored selection as active selection.

According to a preferred variant, in the method there are the further steps of:

(v) receiving a command from the user via the graphical interface to store the selection of step (i) or (ii), or to store a new selection acquired as in step (i) or (ii), (vi) acquiring through the graphical interface a selection as in step (i) or (ii), (vii) performing step (iii) and (iv) using as selection the selection stored in step (v) and the selection acquired in step (vi), and (viii) performing step (vi) again, then step (vii) and step (viii).

According to a preferred variant, the second selection is acquired as the selection of step (i) and/or is settable as a pre-set reference selection to be used as said second selection in steps (iii) and (iv).

According to a preferred variant, in step (iv) the fields are displayed only if the satisfy a key value or have values falling within a threshold or a range.

As further preferred steps of the method, we mention:
driving the graphical interface so as to display a window to receive by the user a selection command to acquire the first and/or second selection, and/or
applying a search filter to the fields of the first and/or second collection, and/or
accessing a remote database, e.g. via wireless or wired means, and searching therein said fields of the first and/or second collection, transferring the fields found from the database to the graphical interface for the displaying of the step (iv); and/or
driving the graphical interface so as to display a window to receive by the user a selection command to select said key value and/or the threshold or range; and/or
driving the graphical interface in order to display a data in an area intermediate between the graphical interface area occupied by a field of the first collection and the area of the graphical interface occupied by a field of the second collection, the field expressing the result of a math function (e.g. the difference or % difference or the ratio or the % ratio) applied to a numeric field of the first collection and a numeric field of the second collection. In particular, the graphical interface is driven so as to display said intermediate area with a color and/or intensity or chromatic deviation from the surroundings, that is a function of the value of the data relative to the intermediate area.

E.g. the graphical interface is a touch-screen, a smartphone or the touch-screen of a smartphone.

The specific action of the user is e.g. a touch on the touch screen, a pronounced word, a gesture in the air near the smartphone or an appropriate sensor for gesture commands (mounted on any support connected to the machine), a movement done with the smartphone.

E.g. a field from the first and/or second collection may comprise a numeric value of
injection speed of the press, and/or
injection pressure of the press, and/or
injection temperature of the press for the molten material, and/or
injection tonnage of the press, and/or
the diameter of the injection screw in the press; and/or
the efficiency of the injection screw in the press (different for each press); and/or
the size of the injection nozzle; and/or
the volume of the hot runner, and/or
the dimensions of the final cushion of material which remains at the end of the injection inside the injection chamber (the cushion exerts a resistance against the injection screw which varies during the injection phase).

Another aspect of the invention relates to a hardware system for making a or each step of the method.

In particular, the system comprises:
a computer database containing data, e.g. related to simulation results made with finite-element analysis software and/or data related to injection-press parameters obtained following molding tests;
a graphical interface;
a sensor to detect a specific action of the user;
a processor programmed to perform a or each of the steps of the method above, in particular for
driving the graphical interface so as to display a first group of aforementioned data; and/or
detecting a specific action of the user via the sensor, and whether the action is detected; and/or
driving the graphical interface to alternate the displaying, next to the first group of data, of a second group of said data (completely or only a part of them) which is pre-selectable by the user.

As variants of the system we mention:
the database is a remote database, e.g. a website that can be consulted via the Internet or stored in the cloud, or only partially downloadable (only the selected selections); and/or
the database is a local database, stored in a memory directly accessible by the processor (pc, app, tablet, PDA or a specific programmer device).

Another aspect of the invention relates to a software for performing a or each of the steps of the method.

Figure 2:
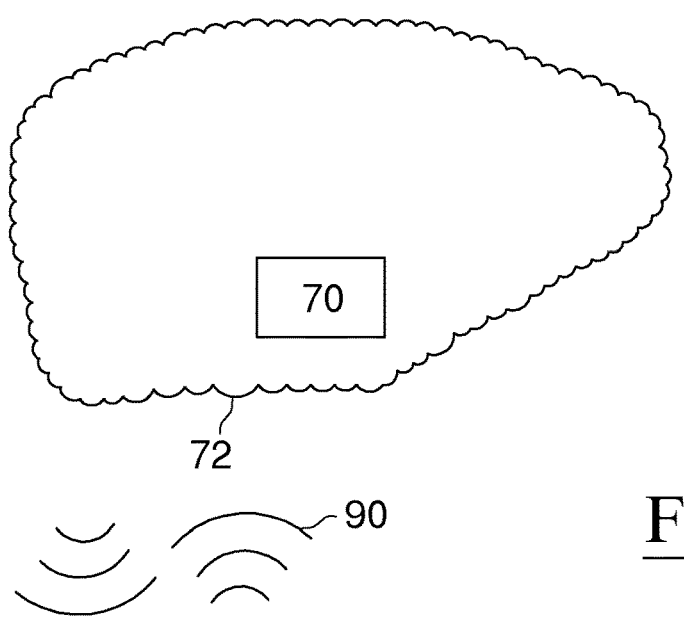
Figure 2:
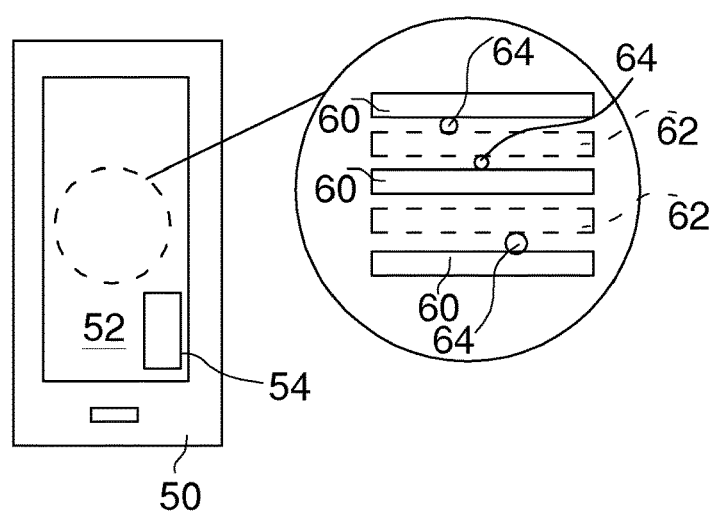

The advantages of the invention will be even clearer from the following description of a preferred device, in which reference is made to the attached drawing in which FIG. 1 shows an internal structure of a database, FIG. 2 shows a schematic view of a system.

In the figures the parts are described as in use.

The method is applied to a management system of data related to a machine (press) or center for injection molding. The machine has a known general structure. E.g. the machine has a control unit, provided with intelligence, which controls the various parts of the molding machine during the molding phases. The control unit is e.g. connected—in a known way—both to actuators (not shown) for moving parts of the mold and injectors, and/or to sensors to detect the state of the actuators and the mold. The control unit comprises e.g. a computer or a microprocessor, too.

With reference to FIG. 2, an operator, equipped with an electronic device 50, e.g. a mobile phone or a smartphone or a PC, can visually analyze the data relating to various process simulations related to the mold filling and/or to programming parameters of the aforesaid control unit set for the molding of a piece (previous works and/or try-outs). The data are organized in an electronic database 70 whose internal structure is shown in FIG. 1.

The database 70 (FIG. 1) comprises data relating to results of simulations carried out with a finite-element analysis software and data concerning injection-press parameters obtained following molding tests (current or performed in the past) or following other similar operations. The database 70 is logically structured in one or more sets 80 (only one shown). Each set 80 is divided into at least two distinct logical portions 82, 84: the portion 82 comprises data relating to simulation results and the portion 84 comprises press parameters (current or performed in the past). The portion 84 may comprise press parameters of multiple tests (try-outs) or parameters resulting directly from the production (job).

Each portion 82, 84 comprises a plurality of data collections 86 internally organized in a plurality of, e.g. numeric or string, fields 88 (only a few numbered).

The device 50 is e.g. equipped with a touch screen or a display 52 and in it e.g. there is loaded and runs an App or program to manage the functions described below.

Via a selection interface, e.g. presented on the touch-screen or display 52, the user can choose a group of data 60 to be displayed (data present in the database or acquired from external source via QR code, RFID, or radio signal). The data 60 can refer e.g. to data relating to the first and/or second portion 82, 84 of the database 70.

In particular, the device 50 is programmed for:
- acquiring in real time a first user selection aimed at selecting one of the data collections 86 between the portions 82 or 84 (or from an external source),
- acquiring a second selection 86 in the portion 82 or 84 different from the previous one (or from an external source),
- generating from the first user selection and from the second user selection two respective indexes to point to a first and second collection 86 present in the database 70, and
- displaying orderly, through the touch-screen 52, homologous fields 88 of the first and second collection by finding the fields in the database 70 through the generated indexes.

The group of data 60 refers to a group of fields 88 taken from the first of the two selected collections.

The data 60 are present in the memory of the device 50, or more preferably are stored within a remote application 72, in particular on a website or cloud hosted by a server 72 or in a mass memory, which the device 50 accesses—see signal 90—e.g. via the Internet or the GSM network, or they are legible or receivable from an external source.

By means of a command or action of a user, e.g. the touch on an icon or button 54 present on the touch-screen 52 or by saying a specific word or by executing a specific gesture, the user activates a routine in the device 50 that alternatively displays (displays/deletes, sets on top or bottom, highlights or not) on the touch-screen or display 52 a second group of data 62 (shown hatched in FIG. 2) close to the data 60. Preferably the second data group 62 is an active (or pre-set or reference) selection. A subsequent and identical action (or a change of page or the expiration of a time-out) of the user removes from the touch-screen or display 52 the data 62.

The group of data 62 refers to a group of fields 88 taken from the selected second collection.

The type and/or nature of the data 60, compared to a collection 86, is—as mentioned—selectable by the user on the device via a selection window (not shown), or it can be pre-programmed as a default condition.

In particular, through an interface the user may establish a search filter (or a selection criterion) for the data 62. By means of the filter it is possible, for example, to make sure that the data 62 are automatically chosen so as to be consistent with the data 60, or referred i.e. to a same piece but for different simulations or molding tests, or to different pieces but for equal or similar simulations or molding tests, or selected after a processing (of parameters and/or conditions).

To improve the consultation of the database 70 as a function of the data 60, preferably the graphical interface that controls the display 52 can be controlled so as to display a third data or groups of data 64. The data 64 is in an intermediate area between the area of the display 52 occupied by a data 60 and the area of the display 52 occupied by a data 62, and expresses the result of a mathematical function applied to the near data 60, 62. This prevents the user from performing the calculation in his mind or in a separate window, saving resources, and allows an immediate display of the numerical relationships between the data 60, 62, or of the contents of the database 70.

It is also possible to display only part of the data 64 or those relevant to the set mathematical function, for example only those that exceed a set percentage.

In a variant the data 60, 62 are presented together on a new page or screen of the device 50, without alternation.

The invention claimed is:

1. Software-implemented method for comparing, via a graphical interface, data relating to an injection process carried out by an injection press,
   with the steps of
   (i) simulating with a finite-element analysis software an injection molding process and saving the results of the simulation as a first data,
   (ii) performing an injection molding process and saving parameters obtained therefrom as a second data,
   (iii) storing the first and second data in an electronic database logically structured in one or more sets, each set being divided into at least two logical portions, each portion comprising in data collections a plurality of said first and second data, respectively, internally organized in a plurality of fields,
   (iv) acquiring in real time through the graphical interface a first selection by a user aimed at selecting one of the data collections,
   (v) acquiring in real time through the graphic interface a second selection by a user aimed at selecting another data collection, different from the previous one,
   (vi) generating from the first selection of step (iv) and from a second selection of step (v) two respective indexes to point to a first and second data collection in the database,
   (vii) displaying, in an orderly manner through the graphic interface, homologous fields of the first and second collection by finding the fields in the database through the generated indexes.

2. Method according to claim 1, wherein the selection acquired in step (iv) and the selection acquired in step (v) refer to collections belonging to different portions.

3. Method according to claim 1, in which a selection or each selection of the user is acquired through a drop-down or scrolling or pop-up menu generated by or on the graphic interface.

4. Method according to claim 1, wherein the selection acquired in step (iv) or in step (v) is acquired directly or indirectly from an external source through a communication means.

5. Method according to claim 1, wherein step (v) is activated by a command or gesture of the user entered or acquired by means of a command input interface generated or present on said graphic interface.

6. Method according to claim 1, wherein in step (vii) all of the fields are, or only a part of the fields is displayed by alternating the display of the fields of a collection with those of the other collection.

7. Method according to claim 6, wherein the alternating is controlled by a command or gesture of the user entered or acquired by means of a command input interface generated or present on said graphic interface.

8. Method according to claim 6, wherein in step (vii) the fields are displayed by generating a new page on the graphic interface, on the page displaying together the fields of the two selected collections.

9. Method according to claim 1, wherein the selection acquired in step (i) is modified after the execution of step (iii) and step (iv) while the second selection of step (ii) remains stored as active selection.

10. Method according to claim 1, wherein in step (vii) the fields are displayed only if they satisfy a key value or have values falling within a threshold or a range.

11. Method according to claim 1, with the further steps of:
(viii) receiving a command from the user via the graphical interface to store the selection of step (iv) or (v), or to store a new selection acquired as in step (i) or (ii),
(ix) acquiring through the graphical interface a selection as in step (iv) or (v),
(x) performing step (vi) and (v) using as selection the selection stored in step (viii) and the selection acquired in step (ix), and
(xi) performing step (ix) again, then step (x) and step (xi).

12. Method according to claim 1, wherein the second selection is settable as a pre-set reference selection to be used as said second selection in steps (vi) and (vii).

13. Method according to claim 1, with the further steps of accessing a remote database and searching therein said fields of the first and second collection,
transferring the fields found from the database to the graphical interface for the displaying of the step (vii).

14. Method according to claim 13, wherein the accessing of the remote database occurs via wireless means.

\* \* \* \* \*

UNITED STATES PATENT AND TRADEMARK OFFICE
CERTIFICATE OF CORRECTION

| | | |
|---|---|---|
| PATENT NO. | : 11,747,961 B2 | Page 1 of 1 |
| APPLICATION NO. | : 17/609845 | |
| DATED | : September 5, 2023 | |
| INVENTOR(S) | : Andrea Tellan and Riccardo Villa | |

It is certified that error appears in the above-identified patent and that said Letters Patent is hereby corrected as shown below:

On the Title Page

Assignee item (73):
Change -- "INGLASS S.P.A. - CON SOCIO UNICO, San Polo di Piave (TV), (IT)"
To -- "INGLASS S.P.A., San Polo di Piave (TV), (IT)"

Signed and Sealed this
Third Day of October, 2023

Katherine Kelly Vidal
*Director of the United States Patent and Trademark Office*